Sept. 20, 1932.                F. B. CROSIER                    1,878,382
                    STEREOSCOPIC MOTION PICTURE CAMERA
                      Filed May 13, 1929      4 Sheets-Sheet 1
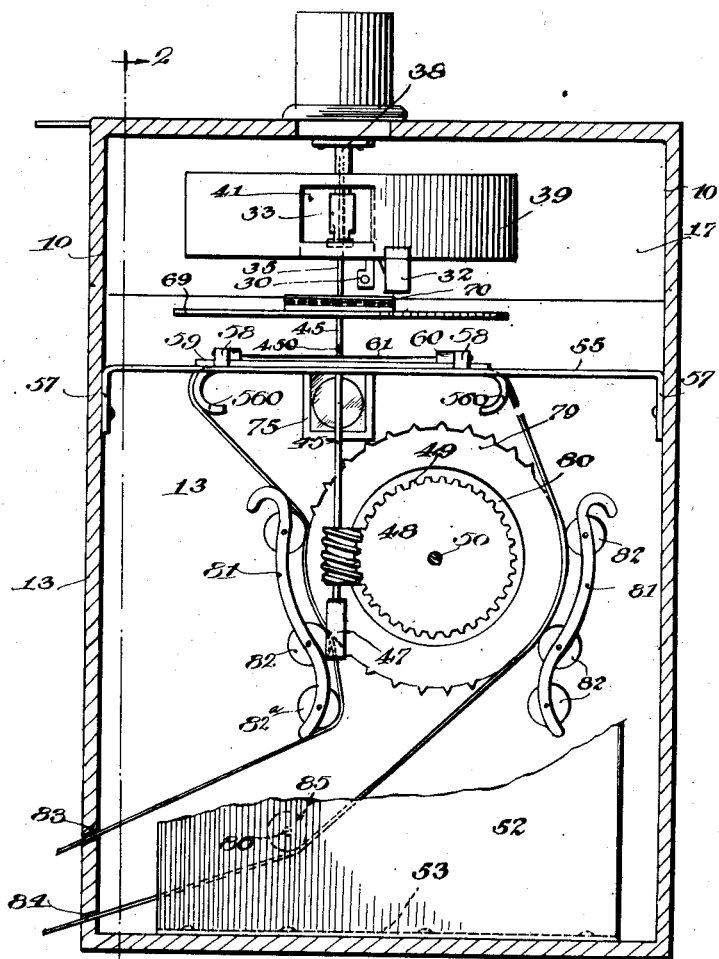
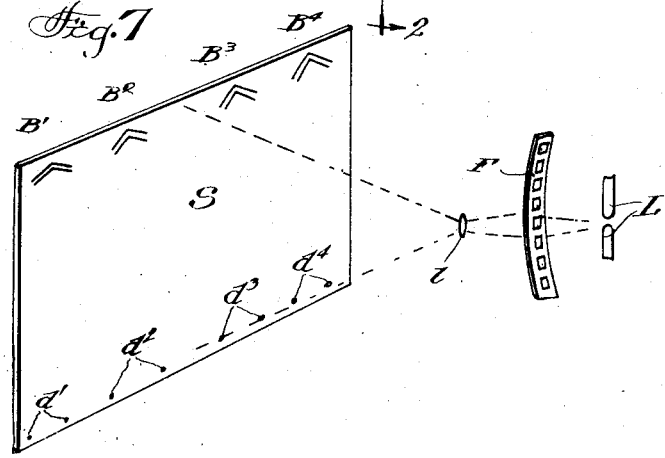
INVENTOR
F. B. Crosier
BY
ATTORNEY Sept. 20, 1932.  F. B. CROSIER  1,878,382
STEREOSCOPIC MOTION PICTURE CAMERA
Filed May 13, 1929  4 Sheets-Sheet 2
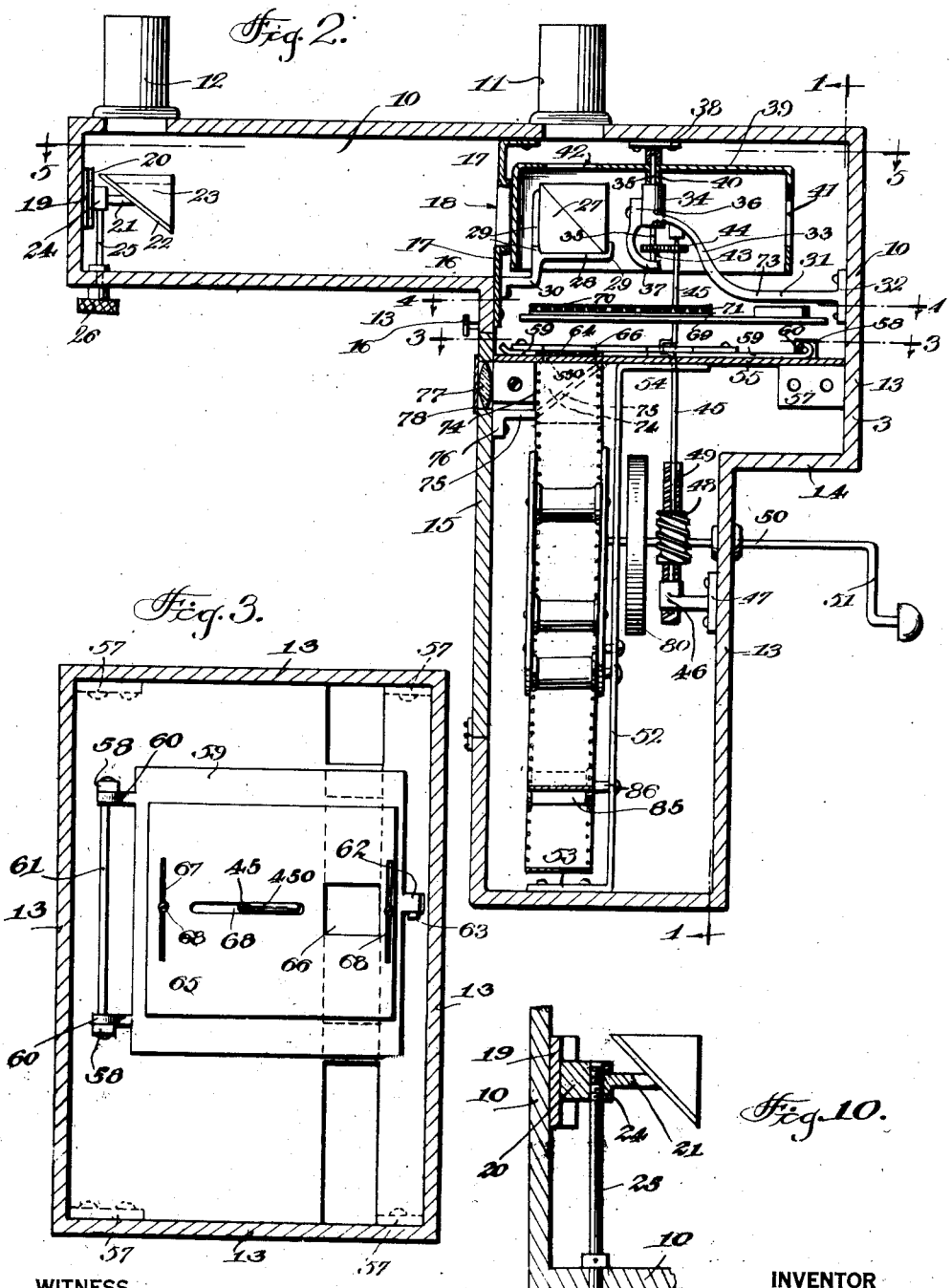
WITNESS
INVENTOR
F. B. Crosier
BY
ATTORNEY

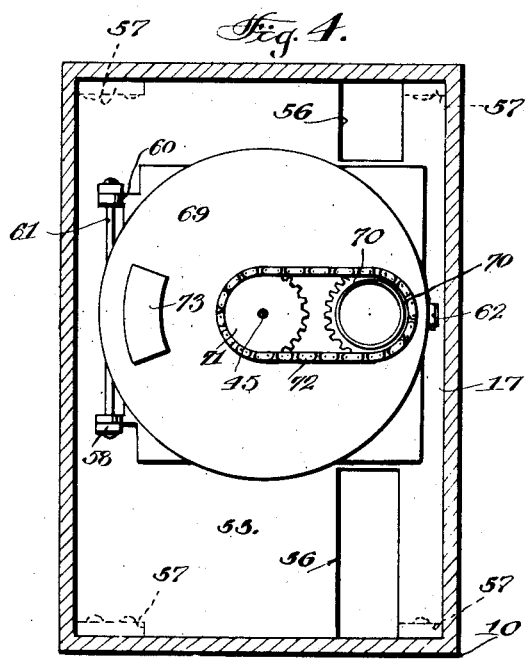

Sept. 20, 1932. F. B. CROSIER 1,878,382
STEREOSCOPIC MOTION PICTURE CAMERA
Filed May 13, 1929 4 Sheets-Sheet 4
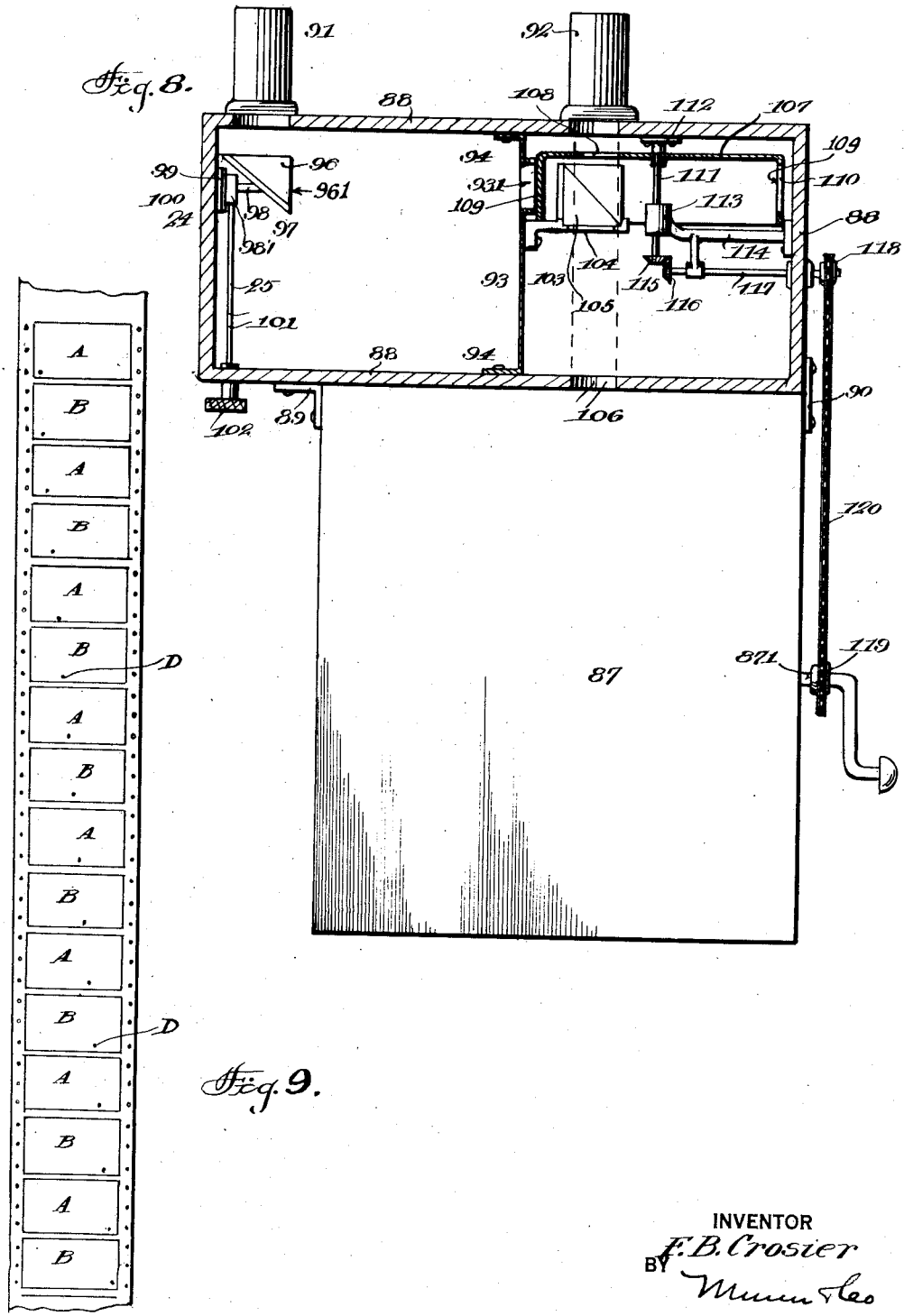
INVENTOR
F. B. Crosier
BY
ATTORNEY Patented Sept. 20, 1932

1,878,382

UNITED STATES PATENT OFFICE

FRANK B. CROSIER, OF BELOIT, WISCONSIN, ASSIGNOR OF ONE-THIRD TO ARTHUR BOONE CROSIER AND ONE-THIRD TO MINNIE G. CROSIER

STEREOSCOPIC MOTION PICTURE CAMERA

Application filed May 13, 1929. Serial No. 362,666.

This invention relates to the motion picture art, and is more particularly concerned with stereoscopic motion picture cameras for producing binocular motion picture effects, and it consists in the construction, arrangements and combinations herein described and claimed.

Binocular photography has always been recognized as the ideal method of securing images with depth or in relief but heretofore has not been made practical for motion picture film production and projection owing to the difficulties presented by the methods heretofore employed for the production, projection and viewing of such films.

The device involved herein is predicated upon the known properties of the human eye, i. e., (1) persistence of vision by which an impression on the retina remains for a short time after one of a series of successive views are shown so that each such successive views merge as one on the retina as a continuous uninterrupted optical display, and (2) on that property of the human eye known as "optical synthesis" by which the two eyes automatically merge together a right and a succeeding left binocular view which two views are combined in retina placement in point of time by persistence of vision.

This continuity of optical impression or persistence of vision coupled with the faculty of optical synthesis makes possible the further and important feature in my device, of photographing successive right and left binocular views in successive instants of time.

My apparatus may be employed, with the aid of adapting apparatus with standard motion picture photographic apparatus but is preferably practiced by means of a specially designed photographic device increasing the time interval between successive photographic impressions, which, in the normal motion picture camera is at the rate of sixteen exposures per second, thus giving the eye, when the film is projected, more time to function in synthesis with little or no strain, and within the time range of persistence of vision.

My apparatus for producing binocular motion photography includes as an important feature in addition to the alternation of views in successive instants of time, the recording of these successive right and left views upon successive sections of a continuous film at a common point of focus so that proper registry is secured and application of the film to the present day standard single lens motion picture camera is permissible.

The invention also includes as an important feature means by which it may be adapted to the present day standard single lens motion picture camera. The operating media will be more clearly apparent from the following detailed specification which is to be read in conjunction with the accompanying drawings forming part thereof and in which:

Figure 1 is a longitudinal vertical section through a binocular motion picture camera constructed in accordance with and practising the method of this invention, the section being taken on line 1—1 of Figure 2.

Figure 2 is a horizontal section through said camera, taken on line 2—2 of Figure 1.

Figure 3 is a transverse vertical section taken on the line 3—3 of Figure 2 and showing the shutter mechanism.

Figure 4 is another transverse vertical section taken on the line 4—4 of Figure 2 and showing the rotating lens plate of the camera.

Figure 5 is a transverse vertical section on the line 5—5 of Figure 2 showing the rotating shutter drum admitting a photographic impression prismatically transmitted from one binocular lens to a second transmitting prism within the drum through which second prism photographic impressions from the other binocular lens also pass to a common point of focus on the film for both lenses.

Figure 6 is a diagrammatic plan view of a one second film strip of binocular pictures photographed in accordance with the operating media of Figures 1-5.

Figure 7 is a diagrammatic illustration of the projection of a binocular film made in accordance with the present invention and the binocular photographic media of Figures 1-5 with the double brackets representing pairs of complemental right and left binocular views in time sequence and the dots representing successive time sequences of individual successive film pictures.

Figure 8 is a view in horizontal section of a binocular photographic attachment to the standard single lens motion picture camera, with the attachment embodying the operative principle and structure of the prismatic transmission of binocular photographic light impressions to a common point of focus for the film.

Figure 9 is a diagrammatic plan view of a one second section of film made by such a standard motion picture camera with the binocular attachment of Figure 7 applied thereto, the progressive movement of the dots toward the right side of the film representing the progressive time element in the photographing of successive views.

Figure 10 is a detail of the prism adjustment.

Referring to the drawings by numerals, 10 designates the rectangular front casing of the binocular camera mounting right and left binocular focusing lenses 11 and 12 in its front face which is apertured to receive the lenses 11 and 12 and transmit light therethrough to the interior. The back of this casing, at one side, the right, as shown in Figure 2, is open and communicates with the front end of a rearwardly extending box-like casing section 13 of coincident height, preferably set back at 14 rearwardly of its junction with the front casing at the crank handle side for compactness, and having a maximum width or horizontal dimension approximating one half of that of the front casing 10 at the side opposite the set back 14. A wide door 15 having a latch 16, provides for access to the interior.

Within the front casing section 10 substantially at its transverse center, a light shield plate 17 is interposed, said plate having a centrally located light transmitting opening 18 therein. This shield is interposed in the interior of casing 10 between the right and left binocular lenses 11 and 12 and divides the interior of the casing section 10 into a left and right compartment with the rear face of the latter open and communicating with the open front end of the rear casing section 13.

To the interior face of the left end of the casing section 10, is secured a plate 19 having its outer face slotted longitudinally and horizontally. Dovetailed into this slot is the base 20 of a stem 21 carrying a prism holding frame 22 and positioning the frame substantially in the rear of the left binocular lens 12 and in substantial transverse alinement with the opening 18 in the light shield plate 17. This frame 22 is formed with an inclined base or back and horizontal sides with right edge flanges as shown in Figure 2 seating and retaining therein a total reflecting prism 23 of the usual right isosceles triangular form in principal section with its hypotenuse seating against the back of the frame 22 and its right angled faces in parallel with the left lens casing opening and with the opening 18 in the light shield 17, respectively. Light entering one face from the lens 12 is deflected and issues from the adjacent angled face at right angles to its line of entry and in the direction of the shield opening 18 to pass therethrough.

In order accurately to position the prism reflector 23 with reference to this opening, its stem 21 is formed with an enlargement 24 traversed by a threaded bore in which is inserted the threaded end of an adjusting shaft 25 which projects through and is held in the rear wall of casing section 10 for rotation and carries a knurled operating knob 26 exteriorly of and at the rear of the casing.

At the right hand side of the casing section 10 as shown in Figure 2 within the light shield plate 17 and in line with the opening 18 therein a second total reflecting prism 27 with the cross section of an isosceles right angle triangle is mounted with its hypotenuse inclined to and alined with the casing opening of the right hand binocular lens 11 and with one of its right angular sides horizontally alined with the confronting right angle side of the first prism 23 and with the opening 18 in the shield plate. This prism 27 is supported within a hollow rectangular casing 28 having side and base edge flanges 29 for retaining the prism 27 therein and having an offset angle bracket 30 secured at its lower edge to the interior of the casing as shown in Figure 2.

At the opposite side of the casing on its interior a bracket 31 is provided with a bifurcated base 32 screwed or otherwise secured to the interior faces of the abutting edges of the casing sections 10 and 13. The bracket 31 at its inner end is formed with a forwardly extending arm 33 terminating in a bearing hub 34 through which extends the horizontal driving spindle 35. A bracket 36 secured to the hub 34 has an arm 37 extending therefrom with its end terminating in line with and formed as a bearing for the rear end of the spindle 35. The forward end of the spindle 35 is journaled in a bearing plate 38 secured to the inner face of the front wall of the casing section 10 at one side of the opening for the right hand binocular lens 11.

A cylindrical shutter 39 is affixed by any suitable means as by the boss 40 to the shaft 35 forwardly of the bearing hub 34 and has its peripheral flange interposed between the light shield plate 17 and the reflecting prism 27. This flange is provided with a light opening 41 therein alining with the shield opening 18 and with the reflecting prism 27 in one rotative position of the shutter cylinder and with its forward face in line with the opening in the casing 10 mounting the right hand binocular lens 11 provided with a second opening 42, these openings as shown being in a common diameter of the cylinder at opposite sides of its axis of rotation so that for one complete revolution of the shutter cylinder, successive exposures may be secured through the shutter openings 41 and 42 with one occurring each half revolution of the cylinder. The rear face of the shutter cylinder 39 is open and its rear edge clears the brackets 30 and 31 and encloses them. The shutter spindle 35 is rotated through a gear 43 mounted on the spindle 35 between the bearing hub 34 and its rear bearing 37 and meshing with a second gear 44 fixed to the forward end of an operating shaft 45 extending rearwardly therefrom in the rear casing section 13. The forward end of this shaft is journaled in the forward extension 33 of the bracket 31 within the cylindrical shutter and its rear end journals in a bearing 46 provided with a bracket 47 secured to the inner face of the rear casing section 13. Adjacent its rear end, the shaft 45 mounts a worm 48 meshing with a worm gear 49 mounted on a crank shaft 50 traversing the rear casing section 13 forwardly of the bracket 47 and extending to the exterior of the casing rearwardly of the offset 14 where it is formed with a handled crank 51.

The rear casing section 13 is divided vertically and longitudinally by a partition plate 52 having a laterally offset rear end 53 suitably affixed to the inner face at the rear end of the casing section and extending forwardly and provided with a reversely offset forward end 54 which is suitably attached to the rear face of a film guide plate 55 positioned in the forward portion of the casing section 13 and spaced rearwardly of the cylindrical shutter 39 and of the bracket 32. This plate extends horizontally and vertically for the full width and height of the interior of the casing section 13 at its forward end and is slotted vertically from its upper and lower edges as shown in Figure 3 in the vertical plane of the reflecting prism 27 and the shutter opening 42, the slit portions 56 of this plate 55, which is of metal, being inturned rearwardly on a curve to constitute film guides 560 as shown in Figure 1. The end edges of the plate at the upper and lower corners of the casing section 13 are provided with rearwardly extending brackets 57 which are screwed or otherwise affixed to the interior faces of the top and bottom walls of the casing section 13 as best shown in Figures 1, 2 and 3. Preferably, the rear face of a shutter plate 59 in line with the guides 56 is formed with a slight depression providing a film channel and guide as shown in Figure 2. Outstanding from the front face of the plate 55 at one side thereof as shown in Figure 5 are hinge lugs 58. The shutter plate 59 is provided at one edge with a pair of laterally offset hinging lugs 60 cooperating with the plate lugs 58 and journaling on a hinging pintle 61 extending through and held in the hinge lugs 58 of the film plate. The opposite edge of this hinged shutter plate 59 is provided with an offset latching lug 62 engaging frictionally over a nub 63 formed upon the outer face of the film guide plate 55 to latch the shutter plate to the film guide over the film and to permit its ready release for the insertion of the film over the guide. The shutter plate 59 in line with the reflecting prism 27 and with the opening for the right hand binocular lens 11 is provided with an opening 64. Mounted over the outer face of the shutter plate is a sliding shutter 65 in the form of a flat plate having an opening 66 therein alining in one position with the opening 64 of the shutter plate and having adjacent its opposite edges parallel elongated slots 67 therein through which extend guide studs 68 anchored to the shutter plate 59 permitting vertical movement of the shutter 65 to bring its opening 66 into and out of alinement with the opening 64 in the shutter plate rearwardly thereof. Reciprocating movement of the shutter plate is secured through rotation of the shaft 45 which extends through alined bores in the film guide plate 55 and shutter plate 59 and centrally through an elongated slot 68 at which point it is provided with a crank 450 of a length which is effective to reciprocate the plate 65 from and to positions of alinement with the opening 64 in the shutter plate 59 rearwardly thereof. A complete revolution of the shaft 45 is intended to effect a complete reciprocation of the shutter 65 and a full revolution of the cylindrical shutter 39, the intermeshing gears 43 and 44 having a one to one ratio.

Interposed between the cylindrical shutter 39 and the shutter 65 and mounted axially on the shaft 45 is a rotating lens plate 69 having a diameter to interpose its outer edge portion beneath the reflecting prism 27 and over the shutter and shutter plate openings 66 and 64. In line with these openings, the forward face of the lens plate 69 mounts a focusing lens barrel 70 and axially of the shaft 45 and freely rotatable therearound an adjusting sprocket gear 71 is suitably mounted for rotation on the face of the lens plate, the lens barrel 70 being formed also as a sprocket gear connecting with the adjusting sprocket 71 by means of a sprocket chain 72. This arrangement is desirable to facilitate and maintain focusing adjustment of the lens barrel 70. At a point diametrically opposite the lens barrel 70, the outer face of the lens plate 69 is formed with an offset or counter-balance 73 to provide for uniform speed of rotation of the lens plate in operation. It will be noted that the rear face of the lens plate 69 is spaced forwardly of the shutter 65 a sufficient distance to permit the shutter plate 59 to be unlatched and moved forwardly for the insertion of a film strip over the film plate 55. The focusing lens in the lens barrel 70 is designed in the rotation of the lens plate 69 to aline with the opening 64 in the shutter plate in time with the arrival of the opening 66 in the shutter 65 to aline with the opening 64, these movements occurring at the same instant of time and in coincidence with the successive registrations of the openings 41 and 42 with the light shield opening 18 and binocular lens 11 respectively. The film guide plate 55 in line with the opening 64 in the shutter plate 59 is similarly apertured at 550 as shown in Figure 2. In the rear of said aperture, a reflecting prism 74, similar to the reflecting prisms 23 and 27 is mounted in a holder 75 having a bracket 76 extending to and fastened to the inner face of the adjacent side of casing section 13, the prism being mounted to reflect impinging light rays at right angles to the left as viewed in Figure 2. In the line of the reflected path of these rays, the side wall of the casing section is apertured and mounts a sighting lens 77 for focusing adjustment of the lens 70. A tightly fitting cap plate 78 normally covers the outer face of the lens 77 and prevents admission of light to expose the film.

A toothed film feeding spool 79 of conventional form is mounted axially on the inner end of the crank shaft 50 which is extended through the partition 52 to mount the spool thereon, and at the opposite side of the partition mounts a balance or fly wheel 80 to provide for uniform feeding movement. At the upper and lower sides of the feeding spool, tension roll frames 81 mounting a plurality of film tension rolls 82 are fixed to the partition 52 and laterally offset therefrom to aline with the feeding spool 79. The rearmost roll 82a on the upper of said frames 81 which appears at the left in Figure 1, guides the raw film, which is led in through a slot 83 in the top of the casing section 13 from the raw film reel in the usual film box (not shown), customarily mounted on top of the casing above said slot, then forwardly between the rolls of the upper tension roll frame shown at the left in Figure 2 and the feed spool 79, thence over the upper guide 560 to the film channel in plate 59, passing down over the opening 550 and thence back over the lower guide 560 to between the film spool 79 and the rolls of the lowermost tension roll frame 81 from whence it passes over a guide roll 85 mounted on a spindle 86 anchored on the partition 52 (Fig. 2) and through a second slot 84 in the top of the casing section 13 back to the rewind reel (not shown) in said film box.

The worm gearing 48, 49, has a suitable ratio to provide the required revolutions of the shaft 45 to provide movement of the film feed spool 79 advancing successive frames or picture sections of film past the film plate slot 550.

With this timing in view, it will be evident that the operation of the described binocular photographic camera will be as follows: The camera is first properly positioned with the aid of the usual view finder, the film spool being free of film. The crank handle is turned to place one shutter opening 41 or 42 in alinement with its binocular lens 11 or 12, the rotating lens plate 69 and sliding shutter 65 being positioned thereby with their lens and shutter opening in alinement with the prism 27 and shutter door opening 64. With the cap 78 of the focusing lens 77 removed, the focusing of the lenses 11 and 12 and of the lens 70 on the rotating lens plate is determined and effected. The prism 23 of the left binocular lens 12 may be adjusted at this time if necessary. The casing door 15 is opened to effect adjustment of the lens 70.

With the camera properly positioned and focused, and the usual film box (not shown) containing the reel of raw or unexposed film and the rewind reel upon which the exposed film is wound, mounted on top of the rear casing section 13, in the usual manner, the door 15 is opened and the raw film is threaded over the film spool, over the film plate 55, over the bottom side of the film spool and back to the rewind reel through slot 84. The door being closed, the camera is ready for operation. Rotation of the crank shaft 50 will now feed the film over the film plate 55 in rear of the shutter door opening 64, and coincident rotation of the shaft 45 through the worm and worm gears 48, 49, will cause the openings 41 and 42 of the cylinder shutter 39 successively to register with the reflecting prism 23 from the left hand binocular lens 12, and with the right hand binocular lens 11, respectively, the successive photographic exposures passing through the same reflecting prism 27 and through the rotating lens 70 coincidently positioned in alinement with the prism 27 to focus on the common point of alined shutter openings 66 and 64 and on the film as it passes over the opening 64.

The movement of the crank shaft is to be timed, by hand crank, as shown, or by appropriate motor drive to feed the strip of film past the shutter opening at the proper rate, the intergearing ratio of the crank and operating shafts 50 and 45 and the operating connections of shaft 45 with the cylinder shutter 39, lens plate 69, and shutter 65, being such as to provide timed registrations of the light admitting openings of cylinder shutter 39, rotating plate 69 and shutter plate 65, and because of the successive and alternating registration of the cylinder shutter openings 41 and 42, with the left and right binocular lenses 12 and 11, these successively timed exposures will be alternately left and right binocular views photographically recorded at successive instants of time and thereby recording motion through successive left and right views. In the illustration in Figure 6 a strip of film as taken under these conditions and with the described binocular camera, a designates left binocular views, for example, and b the alternating right binocular views, and the dots c in each picture section by their progressive movement toward the right in successive sections, indicate diagrammatically the passage of time and the successive instants of time at which the successive views are photographically recorded.

The projection of a section of positive film made from the section of original negative such as shown in Figure 6, is illustrated diagrammatically in Figure 7 in which L represents the radiant light emitting element of the projection machine, F, the section of positive film, I the projector lens, and S the screen upon which the image is shown.

On this screen, the passage of time in projection is indicated by the series of pairs of dots, $d'$, $d^2$, $d^3$ and $d^4$, each pair of dots representing successive instants of time in which the successive left and right binocular views of the series of binocular pairs $B^1$, $B^2$, $B^3$ and $B^4$ are thrown upon the screen S by the projection machine.

I have heretofore stated that the operative principle and binocular photographic media, by providing a common focal point for the pairs of binocular views and their recording lenses, make the invention adaptable in method and structure to the standard photographic motion picture camera.

In Figure 8, I have shown in horizontal section, a structural adaptation of the binocular method and apparatus to a standard motion picture camera, shown only in plan view and designated generically by numeral 87. To the front of this camera 87, I apply a binocular attachment embodying the operative binocular light transmitting principle of the form of camera shown in Figures 1 and 2.

A casing 88, rectangular in cross section, and corresponding to the casing section 10 of Figures 1 and 2, is affixed as by brackets 89, 90, at its rear face to the front face of the standard camera 87, whose lens is removed and is supplanted by the left and right binocular focusing lenses 91 and 92 in the front face of the casing 88, the latter of which lenses is aligned with the opening in the casing of the standard camera from which its single lens has been removed. Within the casing 88 between the openings therein for the left and right binocular lenses 91 and 92, a vertical light shield plate 93 traverses the interior of the casing and is attached to its front and rear interior faces through end flanges 94. At the left hand side of the casing as viewed in Figure 8, a total reflecting prism 96, identical with prism 23 of Figures 1 and 2, is mounted in a frame 97 whose supporting stud 98 has a foot plate 99 dove-tailing in the grooved face of a base plate 100 secured to the end wall of the casing. The stud adjacent to its base is provided with an enlargement 981 traversed by a threaded bore which receives the threaded inner end of an adjusting spindle 101 which extends through the rear wall of the casing 88 and is provided with an operating knob 102 for adjustably sliding the stud base, frame and prism toward the front and rear walls of the casing 88. The detailed construction of the frame mounting and spindle is identical with that shown in Figure 10 and need not be recapitulated here.

The light shield plate 93 in transverse alinement with the reflecting face 961 of the prism 96 is formed with a light opening 931 therein. Secured to the side of the light plate 93 opposite to the prism 96 by means of its base bracket is a holder frame 104 for a second reflecting prism 105, the frame and prism being identical with prism 27 and holder 28 of Figures 1 and 2 in structure and function.

The prism 105 is positioned by its holder with one right angular face transversely alined with the light opening 931 of the shield plate and the reflecting face 961 of the prism 96, and with its other and rear right angular face in horizontal alinement with an opening 106 in the casing 88 which coincides with and overlies the lens opening in the front of the casing of the standard motion picture camera 87.

Interposed between the prism 105 and the opening in the casing 88 seating the right hand binocular lens and between the prism and the light shield plate 93, is a cylindrical shutter 107, open at its rear face and having its closed front face provided with a light opening 108 which in one rotated position of the shutter alines with the casing opening seating the right hand binocular lens 92 and with the inclined face of the prism 105 corresponding to the hypotenuse of the right angled isosceles triangle it defines in cross section, and therefore also alining, in this position, with the opening 106 representing the common focal point of both binocular lenses. The peripheral flange 109 of the cylindrical shutter at a point diametrically opposite to the light opening 108 is provided with a second light opening 110 therein alining in a 180° rotation of the shutter from the position shown in Figure 2, with the light opening 931 in the light plate to permit light reflected from the face 961 of prism 96 to pass therethrough, impinge the one right angular face of prism 105 and be reflected by its hypotenuse face at right angles to pass through opening 106 in the rear wall of casing 88. When the shutter opening 108 in the continued rotation of the shutter 107 alines with the lens opening of the right binocular lens 92, it places said opening in line with the hypotenuse face of prism 105 for substantially rectilinear transmission of light through the prism to the opening 106.

The shutter 107 is axially mounted upon and rotated by a shaft 111 whose forward end is journaled in a bearing plate 112 secured to the front wall of the casing 88. This shaft intermediate to its ends extending through a bearing sleeve 113 on the inner end of a bracket 114 adjacent to the inner side wall of the casing 88. The rear end of the shaft carries a bevelled gear 115 meshing with a similar bevelled gear 116 on the inner end of a countershaft 117 extending outwardly through and bearing in the side wall of the casing 88 and carrying a sprocket gear 118 on its outer end. The operating crank or motor shaft 871 of the standard motion picture camera 87 will have mounted upon it externally of the camera casing, a second sprocket gear 119 of equal ratio with the sprocket gear 118 and connected therewith by a suitable sprocket chain 120. Such a standard motion picture camera is constructed and intended for operation at the rate of 16 film frames or picture section exposures per second and this rate of speed is transmitted through the sprocket chain 120 and sprocket gear 118 to shaft 117 and by its gear 116 transmitted to the shutter shaft 111 so that with a binocular attachment such as described the standard motion picture camera 87 will, when operated at its normal speed, photographically record 16 separate pictures per second of time, as shown in the plan diagram of Figure 9, consisting of 8 successive series of left and right binocular pictures A and B, photographically recorded at successive instants in time as graphically shown in series by dots D progressively advancing from the left toward the right side of the picture sections in graphic illustration of the progressive elapse of time between successive picture sections. Such a film similarly to the film shown in Figure 6 will record motion in successive left and right binocular views because of the fact that these views are taken in successive instants of time as with the single lens of present day motion picture cameras, the time intervals between successive pictures being substantially doubled over that used with the forms of the invention shown in Figures 4 and 5. The same operative photographic method and principle, however, apply in both the binocular photographic media and in the adaptation thereof of the motion picture camera shown in Figure 8.

The structural media disclosed herein while representing a preferred embodiment of the invention is intended as illustrative rather than restrictive and structural changes and modifications adapting the invention to different conditions of manufacture and use are contemplated in consonance with the spirit of the invention and scope of the claims.

What I claim, therefore, and desire to secure by Letters Patent is:

1. A binocular motion picture camera comprising a camera casing mounting right and left binocular lenses in its front face, means within the camera casing for presenting successive sections of raw motion picture film to a single focal point in rear of and alined with one binocular lens, means within the casing for transmitting successive photographic light impressions from said right and left binocular lenses to said focal point in alternation comprising complemental prismatic reflecting lenses positioned rearwardly of and in focal alinement with the respective binocular lenses and in light receiving transverse alinement with each other, one of said prismatic lenses being interposed between said single focal point and its alined binocular lens and positioned to function directly to transmit light therethrough from said lens to the focal point and totally to reflect to said focal point light reflected thereto from the other of said prismatic lenses, and shutter mechanism interposed between said prismatic lenses and between said one prismatic lens and its alined binocular lens and operative alternately to permit the passage of right and left binocular lens light impressions to said single and common focal point in time with the presentation of successive sections of raw film thereto.

2. A binocular motion picture camera comprising a camera casing mounting right and left binocular lenses in its front face, a total reflecting right angled isosceles triangle prism mounted within said casing with one right angular face in rear of and registry with one of said lenses, a second total reflecting prism similarly having the cross section of a right angled isosceles triangle mounted in said casing in rear of the second binocular lens having one right angled face in parallel with and transversely alined with the right angled reflecting face of the first prism, and having its hypotenuse face in rear of and alined with the second of said binocular lens and a rear reflecting right angled face in parallel with and opposed to a fixed focal plane, a rotating shutter interposed between said prisms and between said second prism and second binocular lens and having light openings therein alternately registering with the confronting right angled faces of said prisms and with the second binocular lens and the hypotenuse face of the second prism, and means for presenting successive sections of raw film to said common focal point in timed relation to the successive registrations of said rotating shutter for alternate right and left binocular lens light transmission.

3. A binocular motion picture camera comprising a casing mounting right and left binocular lenses in its front fact, a total reflecting prism having the cross section of a right angled isosceles triangle mounted within said casing with one right angled face in the rear of and in registry with one of said lenses, means within said casing for presenting successive sections of raw motion picture film to a focal point rearwardly of and in alinement with the second of said binocular lenses, a said second total reflecting prism supported in said casing rearwardly of and in alinement with the second of said binocular lenses, the said second total reflecting prism having the cross section of a right angled isosceles triangle and being positioned between said second binocular lens and said focal point with its hypotenuse face opposed to said lens to transmit directly therethrough to said focal point light from said second lens impinging said face, and with one right angled face transversely alined with and opposed to the reflecting right angled face of said first total reflecting prism and with its other right angled face transversely alined with and opposed to said focal point, respectively, to transmit to said focal point light reflected from said first binocular lens, means for relatively adjusting said reflecting prisms to register, and shutter mechanism interposed between said prisms in their line of light transmission and between said second reflecting prism and its binocular lens, and means for operating said shutter mechanism in timed reation to the presentation of successive sections of raw film to said focal point to transmit to successive sections of presented film at the focal point successively timed alternating right and left binocular photographic light impressions.

FRANK B. CROSIER.